July 24, 1923.

J. E. DERY 1,462,538

GRAIN SHOCKER FOR HARVESTER BINDERS

Filed April 20, 1921   5 Sheets-Sheet 1

WITNESSES

INVENTOR
J. E. Dery,
BY
ATTORNEYS

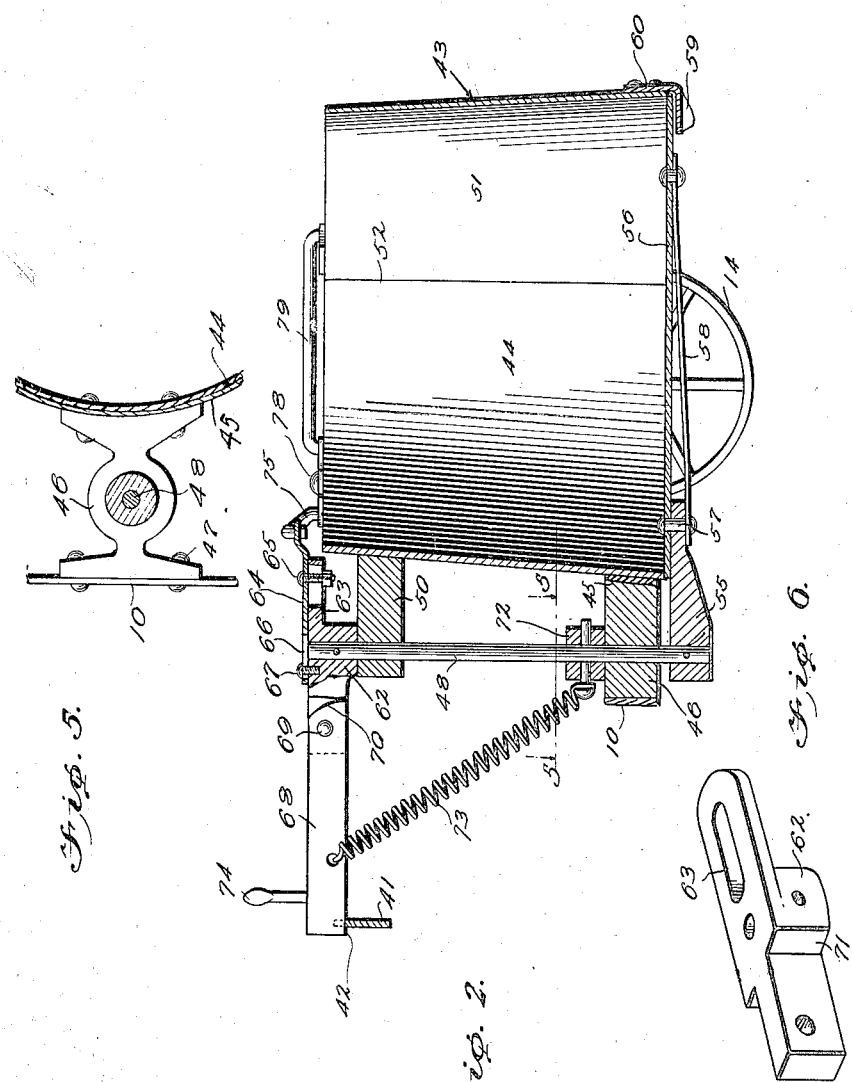

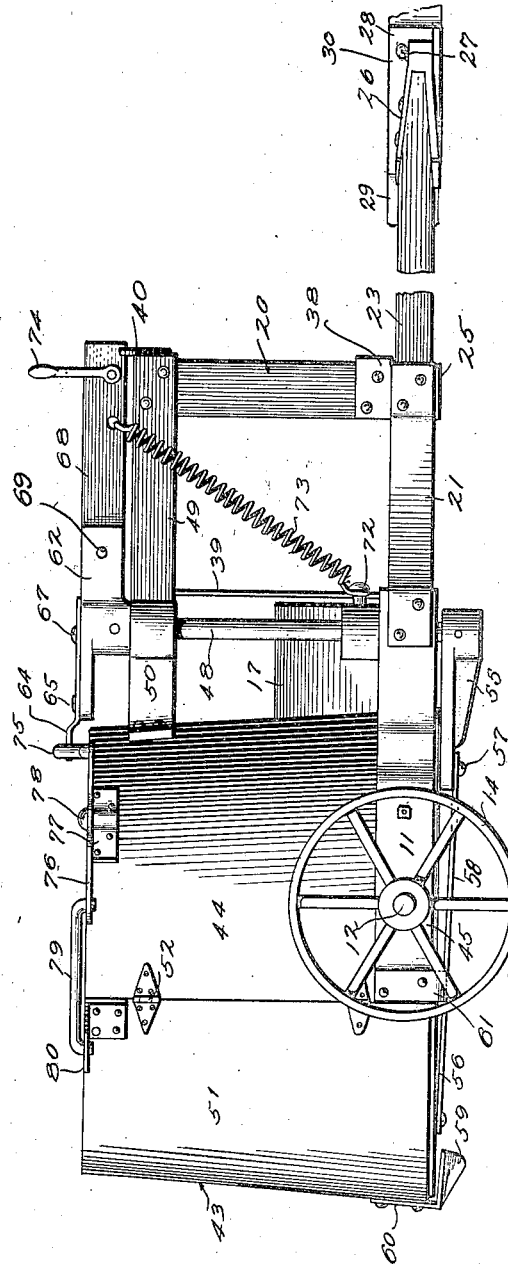

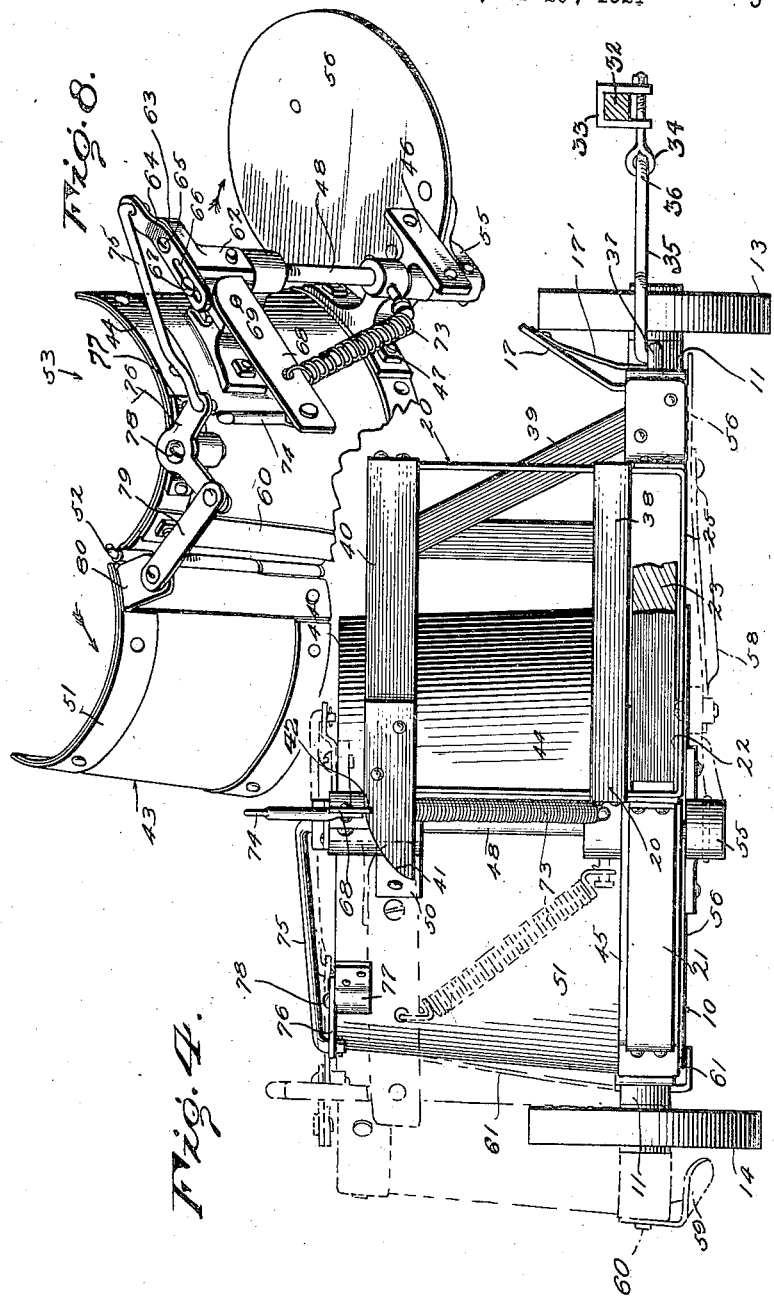

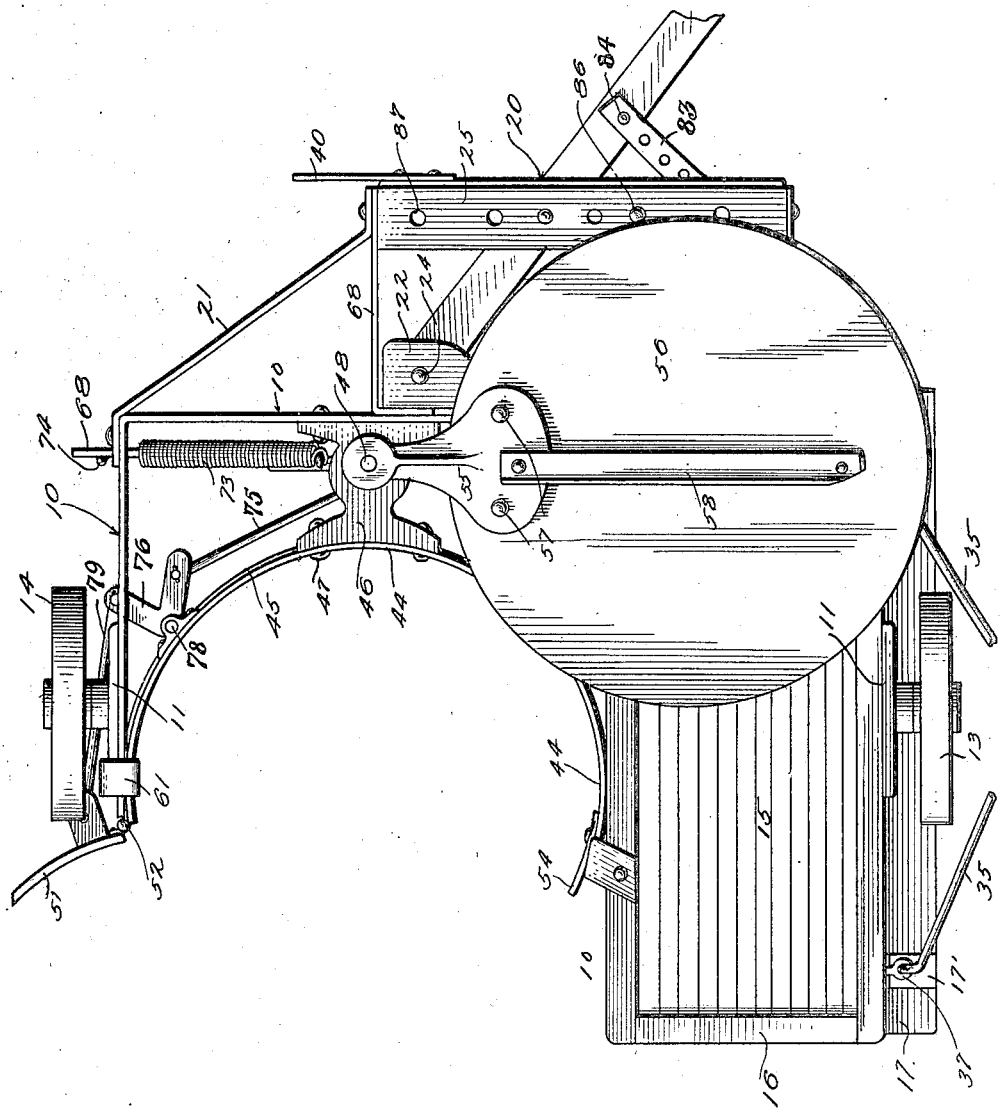

Patented July 24, 1923.

1,462,538

UNITED STATES PATENT OFFICE.

JOSEPH E. DERY, OF EDGELEY, NORTH DAKOTA.

GRAIN SHOCKER FOR HARVESTER BINDERS.

Application filed April 20, 1921. Serial No. 462,905.

*To all whom it may concern:*

Be it known that I, JOSEPH E. DERY, a citizen of the United States, and resident of Edgeley, county of La Moure, and State of North Dakota, have invented certain new and useful Improvements in Grain Shockers for Harvester Binders, of which the following is a specification.

This invention relates to new and useful improvements in shockers for harvester binders.

The purpose of the invention is the provision of an attachment to be applied to the various makes of harvester binders whereby the bundles of grain delivered from the binder are formed into shocks and deposited upon the ground in an upright position.

A further object and essential feature of the invention is the construction of a shocker in such a manner as to admit of its ready adaptation or attachment to harvester binders in use without requiring changes or rendering such changes necessary in fitting the attachment to any of the various makes and styles of harvester binders.

The attachment comprises a platform for the reception of the bundles as soon as they are bound and delivered from the binding mechanism, the farmer or operator on the opposite side of the platform holding the bundles in place during the accumulation or while the required number of bundles is being collected to form the shocks. The platform is also adapted for the reception of the bundles during the interval of depositing the shocks upon the ground and returning the parts to a normal position as above specified.

Other and further objects of my invention will become readily apparent to persons skilled in the art from a consideration of the following description when taken in conjunction with the accompanying drawings, wherein:—

Figure 2 is a vertical sectional view taken on the line 2—2 of Figure 1 and looking in the direction indicated by the arrows.

Figure 3 is a side elevatiton looking toward the outside or that side remote from the harvester binder to which the device is adapted to be connected.

Figure 4 is a front elevation partly broken away and in section of the improved shocker.

Figure 5 is a horizontal sectional view taken on the line 5—5 of Figure 2.

Figure 6 is a detail perspective view of a portion of the operating lever for opening and closing the shocker to dispose the same in a dumping or receiving position, Figure 7 is a bottom plan view of the device, and Figure 8 is a fragmentary perspective view of the former.

Figure 1:
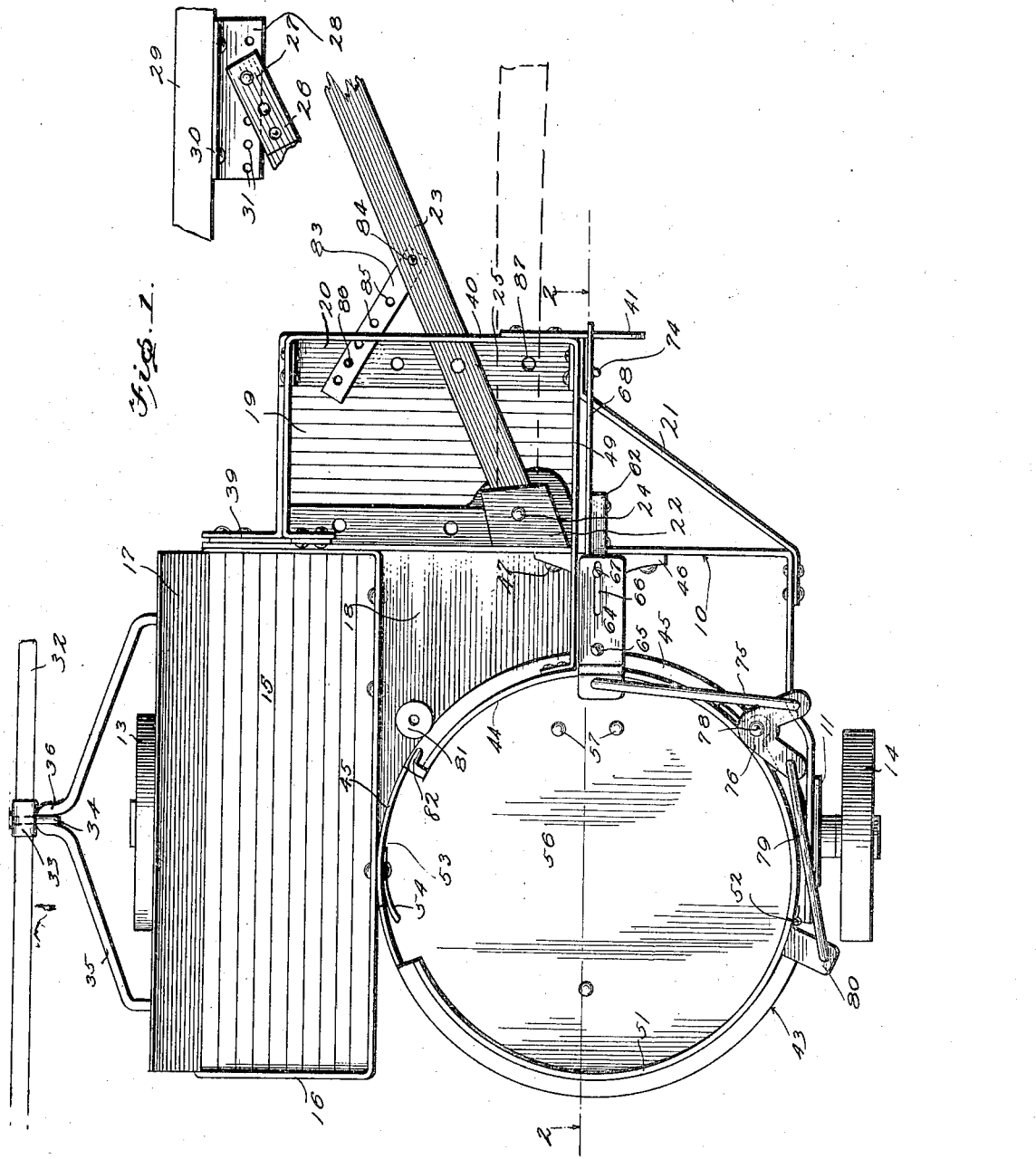
Figure 1 is a top plan view of the improved shocker.

Referring to the drawings in detail, in which like reference characters designate corresponding parts throughout the several views, my improved shocker is shown in the form of a wheeled frame or vehicle 10 at each side of which is disposed a suitable bearing plate and sleeve 11 each provided with a stub axle 12 on which ground or supporting wheels 13 and 14 are journaled and by which the device may be advanced along the ground. The frame is provided at one side with a platform 15 of somewhat elongated and rectangular outline, the flooring thereof being preferably of wood and depressed within the rim or edge portion 16 adapted to form a receptacle for the retention of loose grain therein as will be further explained. At the side which is adapted to be coupled to the harvester binder of any make for harvesting and binding grain in the usual way, the platform 15 is provided with an inclined grain board 17 suitably braced and reinforced by braces or the like 17' disposed at the outside, so as to partly overly the adjacent wheel 13.

Extending laterally from the forward portion of the platform 15 and in line with the ledge of the rim 16 is an auxiliary platform 18 and in front of this auxiliary platform and the adjacent portion of the platform 15, is a platform 19 which is provided with an upright and substantially rectangular coupling frame 20 projecting forwardly and suitably braced to the frame proper, as indicated at 21. This coupling frame includes a channel shaped portion 22 serving as a coupling for a tongue 23, said tongue or pole being connected through the medium of a pin 24 extending vertically through the channeled portion or socket which has its spaced upper and lower portions apertured for this purpose. At the front and between the sides of the frame 20 is disposed a U-shaped member 25 on which said tongue rests in order that the same may be angularly adjusted to properly connect to the binder. The forward end of the tongue or pole is provided with a sleeve 26 having an apertured portion 27 arranged to cooperate with an angle piece 28 in the form of a right angular plate having its vertical web folded to one side of the binder pole 29 as indicated at 30, the horizontal web or flange being provided with a series of spaced apertures 31 by means of which an adjustable connection is afforded between the tongue or pole 23 and the binder pole 29.

The device is also adapted to be attached or connected to the binder frame 32, a U-shaped clamp 33 being mounted thereon with the bight portion at the top and the extremities or leg portions disposed at the bottom and connected by an eye bolt or the like 34. Disposed at the adjacent side of the shocker is a hinged connection rod in the form of a bail 35 pivotally connected in position to the side of the frame 10 along the side of the platform 15 in order to provide a coupling means in connection with the structure just described so as to allow for variations in the ground level as the shocker is advanced along the ground or across a field with the harvester binder. For this purpose, it is necessary to allow vertical movement of one with respect to the other and the bail 35 is of V-shaped formation having an open eye or loop at the central portion as indicated at 36, for connection with the eye bolt 34, the extremities of the bail being connected to eye bolts 37 at the side of the frame beneath the grain board 17, which latter together with the platform 15 are disposed at the outside of the binder deck, so that when the bundles are bound and delivered by the binder mechanism they will fall on the platform 15. The vertical frame or superstructure 20 is provided with a cross piece 38 cooperating with the U-shaped member 25 to removably receive the tongue or pole 23 and allow the frame to swing horizontally on the pivot 24, while preventing and bracing the same against vertical movement or displacement so as to produce a strong and durable draft structure. The frame structure 20 is preferably formed of horizontal and vertical strips suitably braced and bolted in position and forms a substantially rectangular structure opening to the platform 18. An inclined or diagonal brace 39 is mounted in front of the platform 15 and a horizontal portion 40 at the top is extended at the opposite side, where it is tapered or beveled on its upper edge as indicated at 41 so as to produce a notched segment which is provided with a notch 42 for a purpose to be hereinafter made apparent.

A former 43 is provided in the frame at one side of the platform 15, that is, the side remote from the binder, said former being of frusto-conical shape and having a semi-circular stationary section 44 secured to a similar bottom rim or frame portion 45, with an interposed substantially I-shaped bearing and brace member 46 disposed between it and the top of the frame and riveted or bolted thereto as indicated at 47, in order to support the former and provide a bearing for a vertical shaft 48 immediately at the outer edge of the platform 19 and frame structure 20. A brace 49 extends between said frame structure and the top portion of the stationary section 44 of the former for the shocks, thus additionally bracing the same in position and serving also for the attachment of a horizontal outstanding bearing 50 in which the shaft 48 is also journaled. A cooperating movable section 51 of the former is hinged or mounted for horizontal swinging movement at the free outer vertical edge or end portion of the stationary section 44 as indicated at 52 and when the sections are in closed relation, their inner ends are spaced apart to provide an entrance opening 53. In moving to a closed position, the bottom rim or hoop forming a frame for the former at the free end of the movable section cooperates and fits behind a projecting guide member 54 forming a portion of the frame or band 45, thus insuring a snug fit thereof against the platform 15 and retention thereof against displacement or bending.

The shaft 48 extends below the bearing 46 and has connected thereto a casting or arm 55 fixed to turn therewith and provided with an enlarged free end portion bolted or riveted to a circular bottom member or disk 56 as indicated at 57 and supported in a true horizontal position by a brace 58 between the head at the connection 57 and the free edge portion of the disk diametrically opposite thereto. When the disk is disposed to close the lower end of the former it coacts with a guide or shield 59 of angular formation and secured to the outer side of the section 51 as indicated at 60, said guard serving to brace or support the disk at its edge remote from the casting or arm 55 to which it is fixed. An angular guard member 61 is extended vertically of the outer edge of the stationary section 44 and extends beneath the lower portion of the same and the frame at the outside opposite the grain side, so as to receive the adjacent end of the disk or bottom member 56 therebeneath in order to additionally support the same and sustain the weight of the shock thereon when the device is in use.

Fixed to the shaft 48 at its upper end, above the bearing 50 is a cross arm and bearing 62, the same having a slotted portion or arm 63 extending toward the stationary section of the former and slidably and adjustably receiving thereon a plate 64, a bolt 65 being engaged through the plate and through the slot of the portion 63 and adapted to clamp the plate in position. The plate constitutes an adjustable section of the arm 63 and is provided at its inner end with a slot 66 extending longitudinally like the slot in the arm 63 and in alignment therewith, a screw 67 being provided in the bearing arm 62 and engaging the slot 66 so as to adjust the plate or adjustable section of the arm so as to vary the throw of the parts adapted to be connected thereto as will be later described in order to operate the swinging section of the former. A handle 68 is mounted on a horizontal pivot 69 at one side of the outwardly extending arm 62 and is adapted to swing upwardly but is held from swinging downwardly by engagement of its tapered inner end 70 with the shoulder 71 formed on the bearing 62 owing to the reduced width or thickness of the arm extending outwardly therefrom in a vertical position and horizontally apertured to receive the pivot 69 as is clearly shown in Figure 6 of the drawings. Suitable means is provided in order to removably fix or key the bearing 62 to the upper end of the shaft 48 in such a manner that the bearing will rest on the bearing and brace 50 carried by the stationary section of the former. Like the bearing or collar 62 the shaft 48 is provided with a collar 72 which rests on the bearing 46, and thereby serves to support the shaft against downward movement in order that the disk 56 will be properly retained in position for cooperation with the lower edges of the former section and thereby close the bottom of the former for supporting the bundles. The lever 68 is connected to the collar by means of a retractile helical spring 73 so as to normally hold the lever downwardly in position to engage the notch 42 of the segment 41 and hold the parts in closed position, the lever being adapted to be actuated through the medium of the handle or gripping member in order that the same may be raised from the notch against the action of the spring 73 for swinging the movable section of the former to an open position to discharge the shocks. As means for operating the movable section 51 by the lever and handle 68 and 74 respectively, the free end of the adjustable section or plate 64 on the arm is offset upwardly and connected by a rod or link 75 with one arm of a bell crank lever 76 pivoted in a bearing 77 secured to one side of the stationary former section 44 near the top edge thereof as indicated at 78, the other arm being connected by a rod or link 79 with an outstanding arm 80 on the movable section 51 of the former adjacent to the pivot connection 52 so as to require but little movement of the arm in order to swing the pivoted section of the former outwardly to an open position in an opposite direction to the direction of movement of the bottom member or disk 56 which is directly connected to the shaft 48. Thus when the lever 68 is swung outwardly the disk 56 moves inwardly, and the movable section 51 of the former swings outwardly or in an opposite direction with respect to the disk.

When the device is in use, the operation will be substantially as follows:

The platform 15 being in line with the outside of the binder deck, when the bundles are bound and delivered from the binder mechanism, they fall on the grain board and platforms 17 and 15 respectively being discharged into the hopper thus produced. The device of course is coupled to the harvester binder as heretofore described and will travel alongside of the same at the side remote from the grain side. As the bundles are discharged onto the platform, the farmer or operator standing on the platform 19 takes the bundles from the platform 15 and places them in the conical former in an upright position until the required number has accumulated. The operator then binds the shocks, twine for this purpose being retained in a twine box 81 mounted in convenient position on the platform. The twine is passed around the bundles near the top and tied, the twine being cut by means of a knife 82 mounted on the upper edge of the stationary section 44 at the inner end thereof. The operator then grasps the lever handle 74 with his left hand and raises the lever out of the notch 42, subsequently swinging the lever outwardly to a position at right angles to its normal position when engaged in the notch. This will result in imparting opposite movement to the bottom or disk 56 and the movable or hinged section 51 of the former, thus opening the latter by direct rotation of the shaft 48 and pivotal movement of the bell crank 76, pull being exerted on the arm 80 through the medium of the connecting rods 75 and 79, the disk moving under the platform. By this operation, the shocks will be discharged standing upright and when the shocker has pulled up clear of the standing shock, the lever may be actuated in the reverse direction for receiving in the former the bundles for tying in accordance with the previous explanation. In order that the device may be properly attached to the binder, an adjustable brace plate 83 is secured to the pole 23 and is adjustably connected to the front of the platform 19 through the medium of the frame structure 20 thereof at the bottom of the U-shaped member 25, said plate being bolted to the pole or tongue 23 as indicated at 84 and provided with a series of spaced apertures 85 for adjustable connection with the U-shaped member 25, thus serving to hold the pole in any desired adjusted position for connection with the binder truck pole 29 as heretofore explained.

The shocker can be trailed behind the binder by unfastening or removing the pole 23 from the angle piece 28 of iron or steel, and unfastening the rod or bail 35 from the clamp 33, disengaging the bolts and adjusting the pole 23 straight out in line with the shocker where it is held by engagement of the bolt 86 with the opening 87 in the member 25. All loose grain shelled out by the binder mechanism while the bundles are bound and dropped onto the platform 15, will be discharged down the grain board or slide 17 and retained in the hopper produced by the rim around said platform where it can be put up in sacks at spare intervals of time. Furthermore, all loose grain will be placed in the shocker and deposited with the shocks and will thereby be prevented from being lost over the field. By this means, a considerable saving is possible. When the binder is drawn by a tractor, the binder operator will be able to operate the shocker and also the binder and by tying a plurality of bundles together in the manner described and shaped by the former of frusto-conical formation, the shock will stand in all kinds of weather and being tied, will be prevented from coming loose or falling over.

It will also be apparent that the shocker can be attached to any make of binder in a few minutes' time and can be readily detached when necessary for the purpose of trailing the same behind a binder as above pointed out.

In view of the foregoing, it is thought that the operation of the device will be readily understood and in view of its simplicity and practical value it will readily commend itself to those skilled in the art.

Having thus fully described my invention, what I claim is:—

1. The combination with a harvester binder having a truck pole and a frame structure; of a shocker designed to receive the bundles from the binder, and provided with an adjustable pole at the forward end thereof, means affording connection between the pole and the truck pole, means for connecting the side of the shocker in rear of said pole to the binder frame to permit compensating movement therebetween in traveling along uneven road surfaces, carrying and transporting wheels for the shocker, a platform for receiving the bundles of grain from the binder at the outside of the binder deck, said shocker comprising a frame structure, a platform in front of said first named frame for an operator, a frusto-conical former at the outside of said first named platform and having an open portion adjacent thereto, said former comprising a stationary semi-circular half section provided with a bottom supporting rim, a second similar section hinged at the outer end thereof for movement toward and away from the platform into closed or open positions, a shaft vertically mounted on the frame in front of the stationary section of the former, said former being open at the top, a bottom disk fixed to the shaft and operating beneath the sections of the former to close the same and support the bundles of grain on end when placed therein from the platform, and means for turning the shaft to move the bottom disk and movable section of the former to open or closed positions and to discharge the bundles to form the shocks to leave the same standing on the ground, advance of the shocker being adapted to clear the shocks, said movable section of the former having connection with the shaft for actuation upon turning the shaft.

2. A shocker for harvester binders embodying a wheeled frame having means for connecting the same to the binder for compensating movement in traveling over uneven road surfaces, said means serving to permit trailing of the shocker in rear of the binder, said shocker having a platform adapted to receive the bundles from the binder, said platform having a grain board serving to discharge the bundles thereonto, a former positioned at the outside of the platform and comprising a stationary front section and a movable rear section, the inner ends of said section being spaced apart for receiving the grain bundles therethrough, a bottom member suitably supported in association with the former sections and movable in a horizontal plane inwardly from beneath the same, said bottom member being pivoted adjacent to its forward end, and an operative connection between the pivot and the movable section of the former to actuate the same simultaneously in opposite directions, and means for actuating the same, said means being normally held in one position.

3. A shocker for harvester binders embodying a wheeled frame having means for connecting the same to the binder for compensating movement in traveling over uneven road surfaces, said means serving to permit trailing of the shocker in rear of the binder, said shocker having a platform adapted to receive the bundles from the binder, said platform having a grain board serving to discharge the bundles thereonto, a former positioned at the outside of the platform and comprising a stationary front section and a movable rear section, the inner ends of said section being spaced apart for receving the grain bundles therethrough, braces carried by the frame and supporting the stationary section of the former, an additional bearing carried by the former, a vertical shaft journaled in said bearing, means to hold said shaft against vertical displacement, an arm fixed to the lower end of the shaft, a disk fixed to said arm and suitably braced for movement beneath the same and laterally from beneath the former, an operating lever connected to the shaft and having operative connection between one end thereof and the movable section of the former for opening and closing the latter, and means for normally holding said lever in a closed position when the former is adapted to receive the bundles to be tied into a shock and permitting movement thereof to open position to discharge the shock substantially in the manner as and for the purposes specified.

4. A shocker for harvester binders and the like comprising a wheeled frame, having a platform at one side adapted to receive the bundles from the binder, a former supported in the frame adjacent to the platform, said former having a movable bottom portion and a movable rear portion adapted to be shifted laterally with relation to the stationary portion to open the former and adapted when in a closed position to receive a plurality of bundles therein in standing position to be tied, said movable section being hinged to the outer end of the stationary section, guiding means carried by the frame for receiving the free end of the movable section when in closed position and the bottom member is disposed to close the bottom of the former, said former having an opening at the inside adjacent to the platform and being enlarged toward its bottom to free the shocks held therein, means for simultaneously actuating said bottom member and movable section of the former to open or closed position, means for normally holding the last named means in one position when the former is disposed to receive the bundles, and means carried by the stationary and movable sections of the former to support the bottom member whereby to sustain the bundles when deposited thereon and to release the same when discharging the bundles in the form of a shock, said shock being cleared by the advance of the device.

5. A shocker for harvester binders having a platform adapted to receive the bundles from the binder, said platform having a grain board serving to discharge the bundles thereonto, a former positioned at the outside of the platform and comprising a stationary front section and a movable rear section, the inner ends of said sections being spaced apart for receiving the grain bundles therethrough, a bearing carried by the former, a vertical shaft journaled in said bearing, an arm fixed to the lower end of the shaft, a disk fixed to the arm and movable laterally from beneath the former, an operating lever connected to the shaft and having operative connection between one end thereof and the removable section of the former for opening and closing the latter, and means for normally holding said lever in a closed position when the former is adapted to receive the bundles to be tied into a shock and permitting movement thereof to open position to discharge the shock, substantially as and for the purposes specified.

6. A shocker for harvester binders having a platform adapted to receive the bundles from the binder, a former positioned at the outside of the platform and comprising a stationary front section and a movable rear section, the inner ends of said sections being spaced apart for receiving the grain bundles therethrough, a bearing carried by the former, a vertical shaft journaled in said bearing, an arm fixed to the lower end of the shaft, a disk fixed to the arm and movable laterally from beneath the former, and an operating lever connected to the shaft and having operative connection between one end thereof and the removable section of the former for opening and closing the latter.

7. A shocker comprising a shock former consisting of a stationary front section and a movable rear section, a bearing carried by the former, a vertical shaft journaled in said bearing, a disk connected to the lower end of said shaft and adapted to constitute the bottom of the former, an operating lever secured to the shaft and having connection with the movable section of the former.

8. A shock forming machine including a shock former comprising a stationary section and a movable section, a shaft journaled upon said shock former, a disk connected to the shaft and constituting the bottom of the shock former, an operating lever connected to the shaft, and motion transmission means between the shaft and the movable section whereby said operating lever may be utilized to actuate the movable section and the disk.

9. In a shock forming machine, a shock former including a movable section and a horizontal swingable bottom disk, said movable section and said disk being constrained to swing in opposite directions.

JOSEPH E. DERY.